Nov. 24, 1959 J. W. OEHRLI 2,913,932
VARIABLE SPEED PLANETARY TYPE DRIVE
Filed Oct. 4, 1955 2 Sheets-Sheet 2
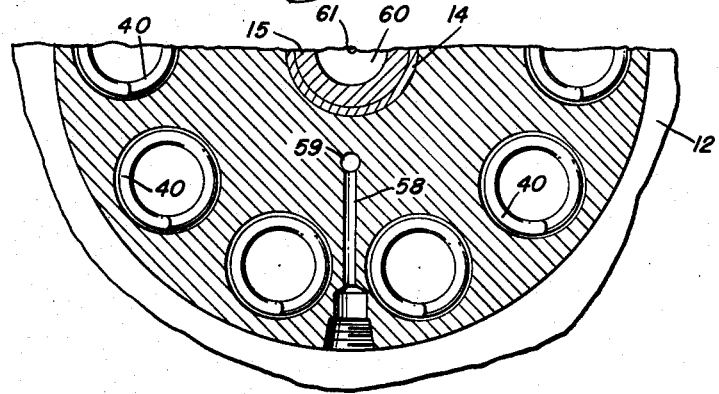
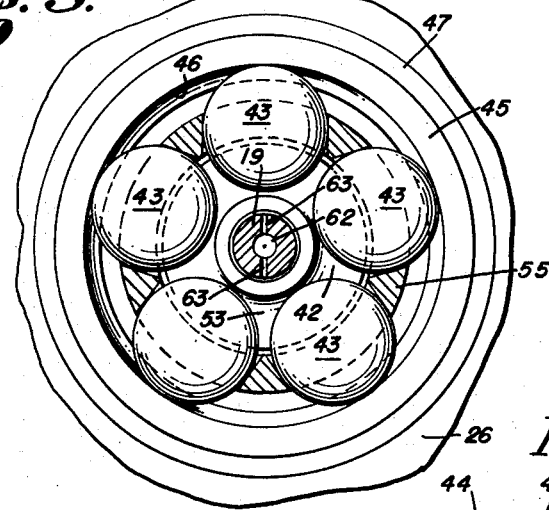
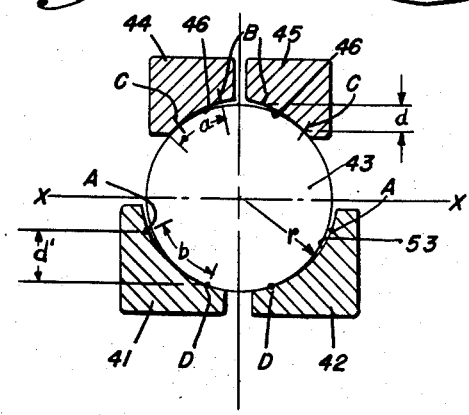
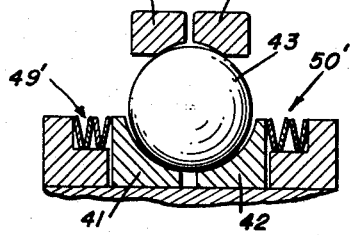
INVENTOR.
JOHN W. OEHRLI
BY
Attorney

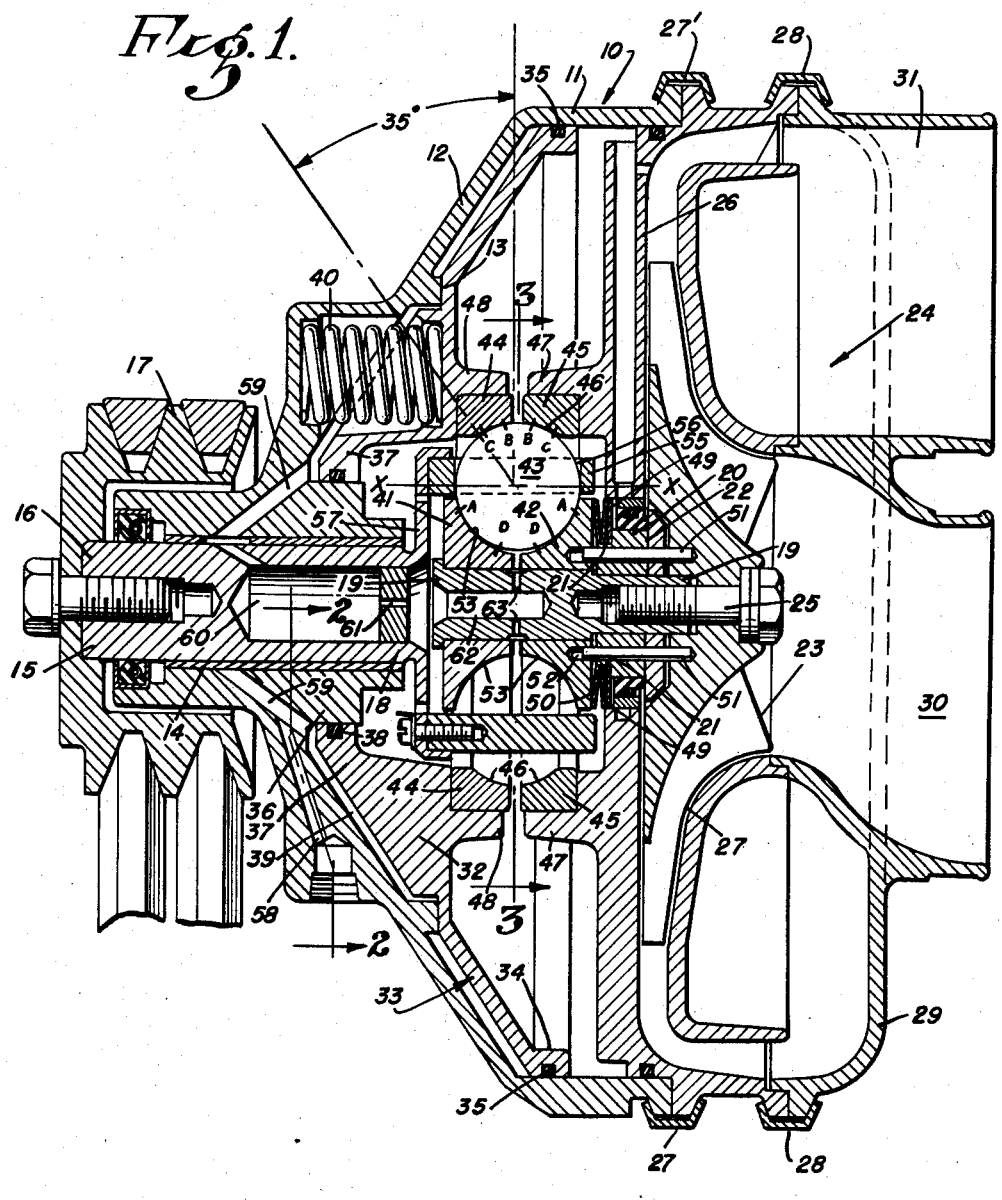

United States Patent Office 2,913,932
Patented Nov. 24, 1959

2,913,932

VARIABLE SPEED PLANETARY TYPE DRIVE

John W. Oehrli, Los Angeles, Calif., assignor to McCulloch Motors Corporation, Los Angeles, Calif., a corporation of Wisconsin Application October 4, 1955, Serial No. 538,303

4 Claims. (Cl. 74—796)

This invention relates to variable ratio transmissions and relates in particular to a simple planetary transmission through which superchargers, automobile accessories, etc. may be driven from the shaft of an engine.

It is an object of the invention to provide a planetary variable ratio drive which is variable by a gradient instead of by step. The invention comprehends a planetary type transmission having balls arranged between split inner and outer races, these inner and outer races each consisting of a pair of rings arranged for axial relative movement with simple means for effecting axial movement of the rings so that the balls will engage different selected portions of the rings, nearer to or further from the shaft axis, thereby varying the driving ratio of the transmission.

It is an object of the invention to provide a driven shaft arranged adjacent an end of a driving shaft, there being a pair of outer race rings surrounding the driven shaft and a pair of inner race rings directly upon the driven shaft with balls between the inner and outer race rings. The race rings of each pair are arranged for relative axial movement and springs are provided for forcing the inner race rings relatively toward each other so that they will act to shift the balls outwardly. Control means are provided for moving the outer race rings axially and relatively so that the positions of the balls radially of the driven shaft may be controlled, thereby controlling the driving ratio of the transmission.

It is a further object of the invention to provide a variable ratio transmission having a cylindrical shell in which the variable drive elements of the invention operate, this shell having an end thereof bearing means for supporting the driving shaft and also having therein a piston arranged to support one of the outer race rings, there being means for introduction into the cylinder of fluid under pressure so as to shift the piston and thereby move the supported race ring toward the remaining outer race ring, thereby controlling the driving ratio of the transmission.

A further object of the invention is to provide a planetary type variable ratio transmission of the character described herein having spring means acting to effect relative movement of the outer race rings toward each other and it is a further object of the invention to provide in this transmission an arrangement whereby high speed of revolution of the balls around the axis of the driven shaft assists in effecting a reduction in the ratio of the transmission, this control being accomplished, at least in part, by centrifugal force acting in the balls to spread apart the outer race rings against the force of spring means.

A further object of the invention is to provide in this device, as a replaceable unit or package, an assembly including the driven shaft with inner races thereon, outer races and balls between the inner and outer races.

A further object of the invention is to provide inner and outer races having novel form contributing to the control and durability of the transmission.

A further object of the invention is to provide as a means for contracting the race rings a spring means having a negative rate of reaction change, that is to say, a spring means wherein increase in deflection is accomplished by decrease in the reactive force exerted by the spring.

Further objects and advantages of the invention may be brought out in the following part of the specification wherein details of a preferred embodiment of the invention have been explained for the purpose of competence of disclosure, without intending to limit the scope of the invention which is defined by the appended claims.

Referring to the drawings which are for illustrative purposes only:

Fig. 1 is a longitudinal sectional view of a preferred form of the invention;

Fig. 2 is a fragmentary section taken on the line 2—2 of Fig. 1;

Fig. 3 is a fragmentary section taken on the line 3—3 of Fig. 1;

Fig. 4 is an enlarged fragmentary sectional view showing the manner in which the balls are shifted inwardly by approximation of the outer race rings, the inner race rings separating axially in response to inward movement of the balls; and Fig. 5 is a fragmentary sectional view showing the manner in which springs may be employed at opposite ends of the inner race rings.

The form of the invention disclosed includes a shell 10 comprising a cylinder 11 and an end wall 12 having therein an annular shoulder 13. Supported in the end wall 12 there is an axial bearing 14 which supports a driving shaft 15 having on its outer end 16 a pulley 17 so that the shaft 16 may be driven from a source of power, such as an automobile engine, by V-belts adapted to run over the pulley or sheave 17.

In axial alignment with the inner end 18 of the driving shaft 15 there is a driven shaft 19 having on its outer end a fixed collar 20 comprising a cylindrical portion 21 and an annular flange or shoulder 22. An impeller 23 of a supercharger 24 is secured to the outer end of the shaft 19 and against the collar 20 by a screw 25. An annular wall structure 26 is secured to the shell 10 by a clamping ring 27'. This annular wall structure 26 includes an impeller chamber 27 in which the impeller 23 operates and has connected to its outer portion, by means of a clamping ring 28, a fitting 29 including an air inlet passage 30 and a discharge passage 31 for the supercharger 24.

The end wall 12 is of generally conical form and contains therein the conical portion 32 of a piston 33 having an annular portion 34 which slides within the cylinder 11, this annular portion 34 carrying a sealing ring 35. The end wall 12 includes a cylindrical wall 36 which projects into the leftward end or annular wall 37 of the piston 33, there being a sealing ring 38 carried by the annular wall 37 in sealing engagement with the cylindrical wall 36, a sealed annular space 39 being thus formed between the piston 33 and the end wall 12 to receive fluid under pressure which will act to shift the piston 33 rightwardly. Compression springs 40 are arranged in a circle between the end wall 12 and the piston 33 to urge the piston 33 rightwardly.

Inner race rings 41 and 42 are arranged on the driven shaft 19. The inner race ring 41 is rigidly secured by press fit on the shaft 19, but the inner race ring 42 is axially movable and is prevented from rotation on the shaft by pins 51 which extend through the collar 20 and project into openings 52 in the contiguous portion of the race ring 42. These inner race rings 41 and 42 define an inner ball race to receive balls 43 of heavy metal, such as steel. Outer race rings 44 and 45 are arranged to engage the outer portions of the balls 43 on opposite sides of the median plane indicated by the line 3—3. The outer race rings 44 and 45 have inwardly faced generally conoidal surfaces 46 which define a channel or raceway to receive the outer portions of the balls 43. The surfaces 46, instead of being truly conoidal are curved concavely in lateral direction, corresponding in a predetermined way to the curvature of the outer surface of each ball 43, thereby producing a line contact between the balls 43 and the surfaces 46 instead of point contact which would occur if the surfaces 46 were made truly conoidal.

The races 44 and 45 are nonrotatable and are supported so as to have relative axial movement toward and away from each other, to effect an inward and outward radial shifting of the ball 43. The outer race ring 45 is carried by an annular wall 47 which extends leftwardly from the wall structure 26, and the outer race ring 44 is supported by an annular wall 48 which extends rightwardly from the piston 33 so that when the piston 33 is shifted rightwardly from the position in which it is shown in Fig. 1, the race ring 44 will be moved axially toward the race ring 45, bringing the outer race rings closer together and causing the balls 43 to be shifted inwardly. When the race rings 44 and 45 are separated, as shown in Fig. 1, points B—B of the balls 43 engage the surfaces 46 adjacent their radially outermost margins, but when approximation of the rings 44 and 45 occurs, bringing them close together as shown in Fig. 4, the points of engagement between the balls 43 and the rings 44 and 45 will be at C—C adjacent the radially inward margins of the surfaces 46.

The inner race rings 41 and 42 are arranged so that they may have relative axial movement whereby they can be spread apart or separated from the position in which they are shown in Fig. 1 to the relative positions in which they are shown in Fig. 4. The race rings 41 and 42 and the race rings 44 and 45 are referred to as complementary for the reason that they cooperate in providing races in which the balls may roll.

To aid in accomplishing this purpose, spring means are provided tending to bring the inner race rings 41 and 42 into positions close together, but permitting them to be moved apart. This spring means comprises one or more dished annular negative rate springs 49 and 50 arranged upon the cylindrical portion 21 of the collar 20, one end of this spring means engaging the flange 22 of the collar 20 and the other end of the spring means engaging the rightward face of the inner race ring 42. The essential characteristics of these negative rate springs will be explained hereinafter.

The inner race rings 41 and 42 have outwardly faced generally conoidal surfaces 53 which are likewise concavely curved in transverse direction. The transverse curvature of the surfaces 53 corresponds somewhat closely to the curvature of the outer surfaces of the balls 43 as shown in Fig. 4, each surface 53 is a surface of generation formed by the revolution around the axis of the shaft 19 of an arc having a radius $r$ which is at least as great, but which might be slightly greater than the radius of the balls 43. When the inner race rings 41 and 42 are relatively close together as shown in Fig. 1, the points of engagement between the balls and the surfaces 53 are as indicated at A, near the radially outwardly margins of the surfaces 53, but when the approximation of the outer race rings 44 and 45 forces the balls 43 inwardly to their extreme positions, shown in Fig. 4, the race rings 41 and 42 will be spread apart and the point of engagement between the balls 43 and the surfaces 53 will be as indicated at D, near the radially inward margins of the surfaces 53. The axially directed force exerted by the spring means 49—50 is of such magnitude that the inner race ring 42 will urge the balls 43 radially outwardly with sufficient force to spread the rings 44 and 45 against the force of the springs 40. Accordingly, if fluid pressure is not applied to the chamber 39 to move the piston 33 rightwardly, the balls will be in the outward positions in which they are shown in Fig. 1, and if the balls 43 are then caused to roll within the outer race rings 44 and 45 they will drive the race rings 41 and 42 and the shaft 19 at relatively low speed. The rolling of the balls 43 in the outer race rings 44 and 45 is accomplished by a driving member 55 comprising a cylindrical wall arranged between the inner and outer race rings and having openings 56 therein through which the balls 43 project, the driving means 55 including at its leftward end a fitting 57 connecting it to the inner or rightward end of the driving shaft 15.

Means for feeding fluid under pressure to the space 39, so as to effect rightward movement of the cylinder 33, includes an inlet passage 58 which communicates with one of a number of diagonal passages 59 positioned in the hub portion of the end wall 12 so as to connect an intermediate portion of the bearing 14 with the inner portion of the space 39 which may be referred to as the cylinder space for the reason that it is associated with the cylinder 11 in which the piston 33 is movable. For lubrication and cooling of the ball and race mechanism, an oil passage 60 is provided in the driving shaft 15 to receive oil from the passage 59. An orifice 61 at the rightward end of the passage 60 provides a nozzle for issuing a fine spray of oil into an axial passage 62 in the driven shaft 19, there being a number of radial passages 63 leading outwardly from the axial passage 62 for delivery of ample lubricant to the bore of the inner race ring 42 and to the balls 43 which in turn carry the lubricant to the outer race rings.

It will be observed that as rightward movement of the outer race ring 44 effects inward radial movement of the balls 43, it will, at the same time, shift the balls laterally in rightward direction. As the balls 43 move inwardly and rightwardly with relation to the surface 53 of the inner race ring 41, the rightward inner race ring 42 is shifted rightwardly along the driven shaft 19 toward the head 20, compressing the spring means 49 and 50. Under these conditions the driven shaft 19, which is supported solely by the balls and the races in engagement therewith will be shifted axially only a very small distance.

As the balls 43 are shifted inwardly from the position in which they are shown in Fig. 1 toward the position in which they are shown in Fig. 4, there will be an increase in the ratio of the speed of the driven shaft 19 to the driving shaft 16, which ratio will be at its maximum value when the contact of the balls 43 with the outer races 44 and 45 has shifted from the points B to the points C, and the contact of the balls 43 with the inner races 41 and 42 has shifted from the points A to the points D. In conjunction with the force exerted by the negative rate springs 49 and 50, centrifugal force acts in the balls 43 to exert a governing effect to prevent overspeeding of the impeller 23 and compensate for changes in the speed of the drive shaft 15. For example, should there be a reduction in speed of the shaft 15, the consequent reduction in speed of the balls will effect a decrease in the centrifugal force acting therein and the resulting inward movement of the balls 43 toward the positions in which they are shown in Fig. 4, will result in an increase in the driving ratio of the transmission and the reduction in the speed of the impeller 23 will be less than the reduction in the speed of the drive shaft 15.

The springs 49 and 50, when relaxed, are each in the form of a dished annular washer, which resists flattening. When this spring is deflected, from relaxed dished state through a flat condition to a reversely dished condition, as described in detail in my copending application, Serial No. 482,019, filed January 17, 1955, now Patent No. 2,835,238 for Supercharger System for Internal Combustion Engines, it will first pass through a first stage wherein it will have a positive rate of reaction, arriving at a maximum value when the spring is deflected to a mid point which is about half way between its initial dished condition and its flattened condition. Thereafter, as the spring is deflected through a second stage from said mid point to and through said flat condition its change in reaction will have a negative rate. That is to say, as the spring is deflected through said second stage its reaction or apparent stored energy will gradually decrease from maximum value to a relatively low value.

When the balls 43 contact the rings 41 and 42 at the points A—A, the axial component of the force of the balls 43 against the rings 41 and 42 is relatively large and at this time the springs 49 and 50 are deflected to a point within the initial of the hereinbefore described second stage so that axial force (reaction) thereof is at a relatively high value to resist the relative large force component applied axially to the ring 42, but when the balls 43 contact the rings 41 and 42 at the points D—D the axial component of the force of the balls against the rings 41 and 42 is relatively small and the springs 49 and 50 being now deflected to a point further along said second stage will exert a reaction which is correspondingly smaller in keeping with the axial component of the force then being applied by the balls 49 and 50 to the ring 42.

In the preferred form of the invention spring means 49 and 50 have been shown at one end of the driven shaft 19. In an alternative, as shown in Fig. 5, dished annular negative rate springs 49' and 50' are also supported upon the inner or leftward end of the shaft 19 to act in opposition to the spring 49 and 50.

The parts of the transmission subject to principal wear and which may require periodic replacement, are the races and balls. In the present invention, these parts are assembled in a relatively inexpensive unit or package which may be readily installed. Such package includes the driven shaft 92 having the race 41 fixed thereon, the race 42 slidable thereon and the collar 20 which is pressed onto the shaft 19 and holds the springs 49 and 50 and the race spring 42 in place. The remaining parts of this package are the balls 43 and complementary outer race rings 44 and 45.

I claim:

1. In a variable ratio transmission: a supporting structure; a cylinder; bearing means carried by said supporting structure; a driving shaft supported by said bearing means; a piston in said cylinder; a driven shaft adjacent the inner end of said driving shaft; first and second nonrotatable outer race rings around said driven shaft; means for supporting said first outer race ring; means connecting said second outer race ring to said piston so that movement of said piston will move said second race ring toward and away from said first race ring; balls arranged to roll in said outer race rings; inner race rings axially movable on said driven shaft in positions to engage said balls; means arranged to urge said inner race rings relatively toward each other and into forcible engagement with said balls so as to force the balls outwardly into engagement with said outer race rings; means on said driving shaft for causing said balls to roll in said outer race rings and drive said driven shaft; means for delivering fluid under pressure to said cylinder to move said piston and said second outer race ring toward said first outer race ring, so that said balls will be shifted inwardly toward said driven shaft and spread said inner race rings; and means for delivering lubricant into the space between said inner races for lubricating and cooling said balls and races.

2. In a variable ratio transmission: a supporting structure; bearing means carried by said supporting structure; a driving shaft supported by said bearing means; a driven shaft adjacent the inner end of said driving shaft; first and second nonrotatable outer race rings around said driven shaft; means for supporting said race rings so that they may have relative movement toward and away from each other; means arranged to force said outer race rings relatively toward each other; balls arranged to roll in said outer race rings; inner race rings axially movable on said driven shaft in positions to engage said balls; means arranged to urge said inner race rings relatively toward each other and into forcible engagement with said balls so as to force the balls outwardly into engagement with said outer race rings; means on said driving shaft for causing said balls to roll in said outer race rings and drive said driven shaft; and means for delivering lubricant into the space between said inner races for lubricating and cooling said balls and races.

3. In a ball type transmission having an outer race means part, complementary inner races part and a spider part, and means for supporting one of said parts so that it will not have rotation and the remainder of said parts so that they will rotate: a support; outer race means carried by said support; balls rollable in said outer race means; complementary inner races engaging the inner portions of said balls; a shaft supporting said inner races, said shaft having therein an oil passage with outlet ports positioned so as to deliver oil to the space between said inner races, to lubricate and cool said balls, said inner races and said outer race means; a second shaft aligned with said first named shaft; and a spider on said second shaft having portions entering into the spaces between said balls.

4. In a ball type transmission having an outer race means part, complementary inner races part and a spider part, and means for supporting one of said parts so that it will not have rotation and the remainder of said parts so that they will rotate: a support; outer race means carried by said support; balls rollable in said outer race means; complementary inner races engaging the inner portions of said balls; a shaft supporting said inner races, said shaft having therein an oil passage with outlet ports positioned so as to deliver oil to the space between said inner races, to lubricate and cool said balls, said inner races and said outer race means; negative rate force applying means urging said inner races toward each other; a second shaft aligned with said first named shaft; and a spider on said second shaft having portions entering into the spaces between said balls.

References Cited in the file of this patent

UNITED STATES PATENTS

| | | |
|---|---|---|
| 1,800,388 | Jacobsen | Apr. 14, 1931 |
| 2,041,284 | Chilton | May 19, 1936 |
| 2,112,763 | Cloudsley | Mar. 29, 1938 |
| 2,446,409 | Chilton | Aug. 3, 1948 |

FOREIGN PATENTS

| | | |
|---|---|---|
| 282,491 | Switzerland | Aug. 16, 1952 |